(12) United States Patent  (10) Patent No.: US 8,687,464 B2
Thompson et al.  (45) Date of Patent: Apr. 1, 2014

(54) MARINE SIREN SEISMIC SOURCE

(75) Inventors: Martin Thompson, Cambridgeshire (GB); Mark Francis Lucien Harper, Cambridgeshire (GB)

(73) Assignee: BP Exploration Operating Company Limited, Middlesex (GB)

( * ) Notice: Subject to any disclaimer, the term of this patent is extended or adjusted under 35 U.S.C. 154(b) by 614 days.

(21) Appl. No.: 12/993,408

(22) PCT Filed: May 20, 2009

(86) PCT No.: PCT/GB2009/050548
 § 371 (c)(1),
 (2), (4) Date: Mar. 14, 2011

(87) PCT Pub. No.: WO2009/141656
 PCT Pub. Date: Nov. 26, 2009

(65) Prior Publication Data
 US 2011/0170375 A1  Jul. 14, 2011

(30) Foreign Application Priority Data

May 20, 2008 (GB) .................................. 0809094.6
 Dec. 22, 2008 (GB) .................................. 0823296.9

(51) Int. Cl.
 *G01V 1/135* (2006.01)
 *G01V 1/145* (2006.01)
 *G01V 1/137* (2006.01)
 *G01V 1/04* (2006.01)
 *G01V 1/38* (2006.01)
 *G10K 5/00* (2006.01)
 *G10K 9/00* (2006.01)
 *G10K 9/10* (2006.01)
 *G10K 9/04* (2006.01)

(52) U.S. Cl.
 USPC ........... 367/148; 367/143; 367/144; 181/120; 116/137 R; 116/142 R

(58) Field of Classification Search
 USPC ............................ 367/143, 144, 148; 181/120
 See application file for complete search history.

(56) References Cited

U.S. PATENT DOCUMENTS 2,110,522 A * 3/1938 Ekman ........................ 116/147
3,540,543 A   11/1970 Bays .............................. 181/0.5
(Continued)

FOREIGN PATENT DOCUMENTS

EP  0 252 377 A2  6/1987
EP  0 747 571 A2  12/1996
(Continued)

OTHER PUBLICATIONS

International Search Report mailed Oct. 5, 2009, in Application No. PCT/GB2009/050548.

*Primary Examiner* — Isam Alsomiri
*Assistant Examiner* — Hovhannes Baghdasaryan

(57) ABSTRACT

A very low frequency marine seismic source has a reservoir of water (47) feeding water to an aperture communicating with the surrounding water (13). The rate of water flow through the aperture is controlled by a rotor disc (11) and stator disc (9) having holes which overlap to a greater or lesser extent as the rotor rotates. The modulation of the flow of water produces a modulated pressure signal which is radiated into the surrounding water. The device is intended to produce acoustic signals over a band extending down to 0.5 Hz or lower.

21 Claims, 8 Drawing Sheets

(56) References Cited

U.S. PATENT DOCUMENTS

| | | | | |
|---|---|---|---|---|
| 3,711,824 A | | 1/1973 | Farron et al. | 340/7 R |
| 3,764,965 A | | 10/1973 | McLean et al. | 340/12 |
| 3,995,125 A | * | 11/1976 | Cypser | 381/391 |
| 4,007,805 A | * | 2/1977 | Reber | 181/120 |
| 4,031,320 A | * | 6/1977 | Brand et al. | 381/73.1 |
| 5,022,790 A | * | 6/1991 | Stevenson | 405/186 |
| 5,636,178 A | | 6/1997 | Ritter | 367/83 |
| 6,439,540 B1 | * | 8/2002 | Tse | 251/127 |
| 7,841,291 B1 | * | 11/2010 | Milanovich | 116/137 A |
| 2004/0045767 A1 | * | 3/2004 | Byrne et al. | 181/241 |
| 2007/0121989 A1 | * | 5/2007 | Inaba | 381/388 |
| 2008/0023264 A1 | * | 1/2008 | Pacini et al. | 181/237 |
| 2008/0066999 A1 | * | 3/2008 | Kostun et al. | 181/250 |
| 2008/0314679 A1 | * | 12/2008 | Rowe et al. | 181/241 |

FOREIGN PATENT DOCUMENTS

| | | |
|---|---|---|
| GB | 1 258 562 | 1/1968 |
| GB | 2 398 086 A | 8/2004 |
| WO | 87/00296 | 1/1987 |

* cited by examiner

MARINE SIREN SEISMIC SOURCE

This invention relates to generating acoustic signals for marine seismic surveys, and particularly but not exclusively to generating such signals at low frequencies including 0.5 Hz or lower.

During the course of seismic exploration there can arise a need to monitor seismic response down to very low frequencies. For example, the accuracy with which seismic data can be inverted to estimate acoustic impedance as a function of depth or travel time is much improved by including very low frequencies in the inversion.

A number of different methods have previously been proposed mainly, but not exclusively, relating to seismic surveys undertaken at sea (marine surveys). They include an underwater trombone ("Suggestions for the development of controlled frequency marine seismic source", O'Brien J T, *Geophysics* NOVEMBER 1986); hydraulically driven sources; ("Development of a hydraulic transducer for marine seismics", Bird J. M., Peacock J. H., Walker L. J. presented at SEG, Atlanta 1984; Cole, U.S. Pat. No. 3,394,775, Jul. 30, 1968; Ross, U.S. Pat. No. 3,578,102, May 11, 1971; Mifsud, U.S. Pat. No. 4,483,411, Nov. 20, 1984; Mifsud, U.S. Pat. No. 4,557,348, Dec. 10, 1985; Gram, U.S. Pat. No. 5,491,306, Feb. 13, 1996); devices based on giant magnetostriction ("Development of a New Improved Marine Vibrator Based on Terfenol-D", Bjflrn & sin-Helm, Saga Petroleum: Rune Tengham, E B Seatech; Ragnar Fritsvold, Norsk Hydro; and Per Anders Osterholt, Master Surveys, Norway, SEG Atlanta 1984); and an electrical vibrator (Newsletter of PGS Geophysical Inc, November 2005).

However none of the proposed methods is described as being capable of producing useful seismic signals at frequencies below 6 Hz.

According to the invention there is provided a marine seismic source suitable for producing seismic signals over a band of frequencies comprising a reservoir containing water, a flow path between the reservoir and a body of water, means to cause water in the reservoir to flow into the body of water via the flow path and means to modulate the area of the flow path so as to modulate the flow of water from the reservoir into the body of water to produce a modulated pressure signal in the body of water.

In this specification, reference to the 'area' of the path refers to a cross-sectional area in a plane lateral to a direction of flow.

In one embodiment, water is caused to flow from the reservoir into the body of water by means of pressurised gas.

Both the reservoir and a pressure vessel used to hold the pressurised gas may be adapted to be held within the body of water. Preferably, the pressure vessel and reservoir are joined and separated by a wall, the wall having a valve to allow the passage of gas from the pressure vessel into the reservoir so as to cause water to flow into the body of water.

To allow the pressure vessel to be refilled, the source may be provided with an air line. Similarly means may be provided to discharge spent gas from the reservoir in order to refill the reservoir from the body of water.

It is preferred that the means to modulate comprises a stator and a rotor located within the flow path the stator and rotor each having at least one aperture which apertures overlap as the rotor rotates. It also being preferred that there be no overlap at one or more angular positions of the rotor, and that the rotor and stator are mounted coaxially and sufficiently close to one another that when there is no overlap of the apertures the flow of water into the body of water is substantially smaller that when the apertures overlap fully.

It is favourable that the apertures of the stator and rotor are shaped so that the area of overlap of the apertures in the rotor and stator varies smoothly as the rotor rotates, the variation may be sinusoidal with angular position of the rotor.

To enable the source to radiate signals throughout the band of the frequencies it is advantageous that the source includes means to cause the rate of rotation of the rotor to change.

In an alternative embodiment in which the flow path comprises a duct arranged to extend downwards into the body of water; the duct is longer than it is wide; and that the means to modulate the area of the duct is located at or towards the lower end of the duct. In this alternative embodiment the seismic source comprises a plenum in communication with the duct at a point above the means to modulate, the plenum being capable of holding a sufficient volume of gas at a pressure substantially equal to that of the water at the point at which the duct area is modulated so as to reduce the resonant frequency of the water in the duct. Preferably the volume is sufficiently large that the resonant frequency is below that of the lowest frequency to be radiated and that that the plenum is connected to the duct via an aperture or apertures having a total area similar to the cross sectional area of the duct.

Where a plenum is included, as described above, it preferably surrounds or partially surrounds the duct.

In yet another embodiment, the seismic source comprises a tube with the modulated duct at the trailing end with means to move the seismic source through the body of water at a given depth so as to cause a flow of water from the body of water through the tube and through the flow path back into the body of water; and buffering means to minimise fluctuations in static pressure of the water within the reservoir and/or flow path as the area of the flow path is modulated.

The buffering means acts to reduce the modulation of the flow of water back into the reservoir thereby allowing substantially monopole acoustic radiation to occur.

The buffering means may take the form of a chamber of gas in communication with the reservoir and/or flow path by one or more passages arranged such that water from the reservoir/flow path can flow into or out of the passage in response to a tendency for the static pressure of the water to increase or decrease so as to reduce the change in pressure of the water.

To ensure that the water level remains within the passages so that water does not flood the chamber, or gas enter the reservoir/flow path, a sensor may be provided to sense the level of liquid within the passage or passages. Additionally means may be provided to adjust the pressure of the gas upon a signal from the sensor that the water level is too high or low.

As an alternative to the rotor and stator, the means to modulate the flow of water may comprise a valve having one or more vanes rotatable between an open and closed position about an axis normal to the direction of fluid flow through the flow path. Typically the valve could take the form of a butterfly-type valve.

The invention will now be described by way of example only with reference to the accompanying drawings in which:—

Figure 5:
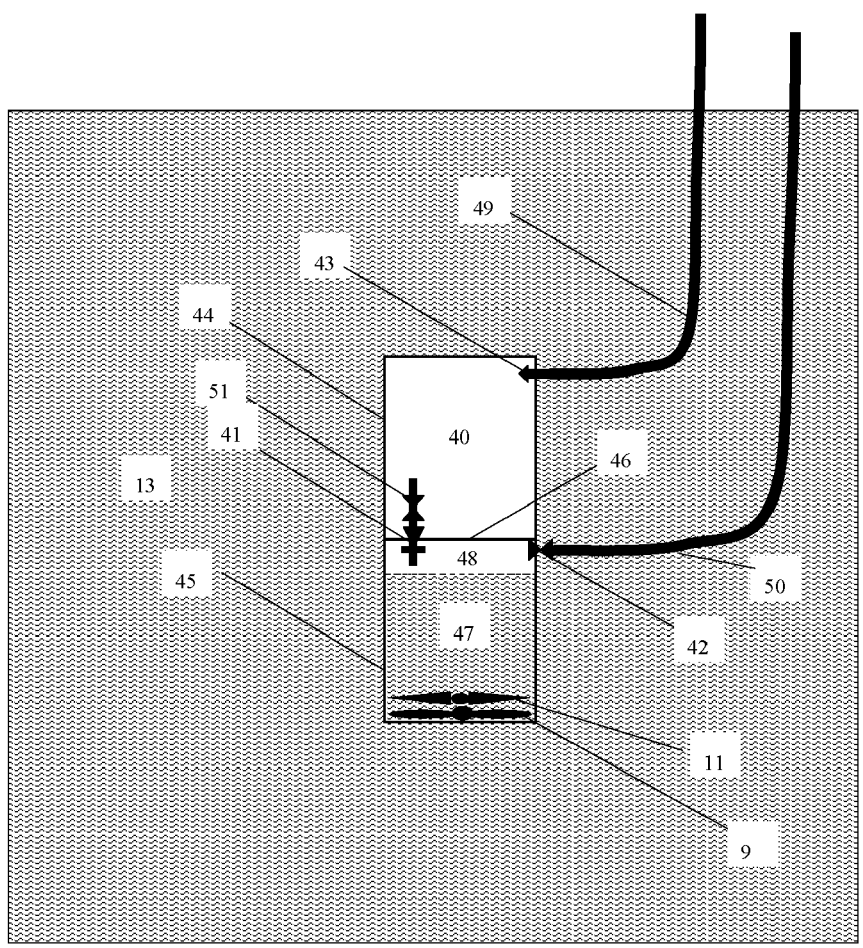
FIG. 5 is side elevation cross section of a marine seismic source.

FIG. 5 shows a seismic source immersed in water 13 which may for example be seawater. The source comprises two pressure vessels 44 and 45 joined with a stiff separation between them 46 that is only breached by a non-return air-valve 41 in series with a two way valve 51. The pressure vessel 45 is open at the base and holds a stator disc 9 and rotor disc 11. The two valves 41 and 51 allow air 40 to flow from vessel 44 into vessel 45 when desired. Pressure vessel 44 contains air 40 at a pressure exceeding the static gravitational head of the external water 13 at the depth of the stator 9 whereas pressure vessel 45 starts off full of water 47 that is discharged through the rotor 11 and stator 9 as air 40 flows through the valves 41, 51 to occupy space 48 above the water 47 in vessel 45. A two way discharge valve 42 is linked by a discharge line 50 to the surface of the sea. The air vessel 44 is linked by an air valve 43 to a recharge airline 49 that goes to the surface of the sea and will be connected to a suitable air compressor. The stator disc 9 is fixed in position and sealed to the wall of the vessel 45 while the rotor disc 11 can rotate about a central vertical axis. The discs are mounted coaxially with a very small separation between them. The motion of the rotor disc 11 about its axis is controlled by a motor, not shown. The rotational position of the rotor disc 11 is sensed by a shaft encoder also not shown which may be used together with the motor in a feedback system to control the position of the rotor disc 11 in a manner well-known to those versed in the art of servo-control systems.

The connected air vessels 44, 45 are suspended at some suitable depth of several tens of meters before operation. The operation will be as follows. The control valve 51 is kept closed and two way valve 42 is kept open while the two vessels 44, 45 are sunk to the required depth. This will flood the pressure vessel 45 with water. Two way valve 42 is then closed. The air pressure vessel 44 is then filled with compressed air through the line 49 and control valve 43 to a pressure that sufficiently exceeds the static head of water at this depth. On reaching the required pressure the control valve 43 may be closed or it may be kept open to allow air through line 49 to help sustain pressure in vessel 44 during discharge of water from the vessel 45 via the rotor disc 11 and stator disc 9. The rotor disc 11 is brought up to the slowest rotational speed. The control valve 51 is opened rapidly and at the same time the rotor disc 11 is ramped up to full speed. A typical time for this ramp in speed would be twenty seconds and the ramp can be linear in time or any other required function of time. The compressed air in vessel 44 passes through the valves 51 and 41 into the vessel 45 and displaces the water 47 through the rotor disc 11 and stator disc 9 causing a pulsating water flow as the aperture through the discs varies with time. As this occurs and the water 47 is displaced so the vessel 45 becomes predominantly full of air. The displacement of the water 47 out of the vessel 45 coincides with and is of the same duration as the acceleration of the rotor disc 11 from its lowest to its highest desired rate of rotation. When the rotor disc 11 reaches its highest desired rate of rotation the valve 51 is closed to prevent further flow of air from vessel 44 to vessel 45 and thereby to prevent further flow of water from vessel 45 via the discs 9,11. The rotor disc 11 is then decelerated and brought to a halt with its holes fully overlapping the holes in the stator disc 9. The air control valve 51 is closed and valve 42 is opened. This will allow the air 48 in the lower vessel 45 to travel through valve 42 up the line 50 and the water to flood back into the vessel 45 through the rotor disc 11 and stator disc 9. Meanwhile the vessel 44 is recharged with compressed air through the line 49 and control valve 43. When water 47 has filled the vessel 45 the valve 42 is closed. The sequence is then ready to be repeated.

Figure 1:
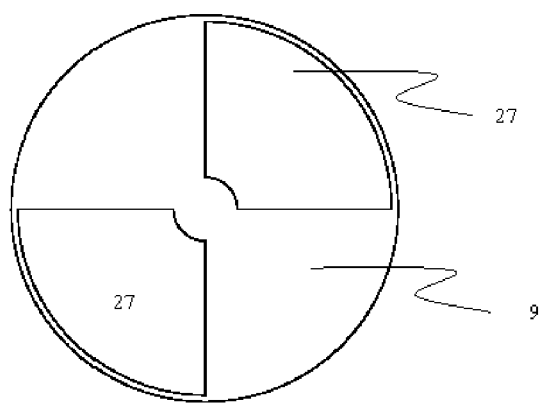
FIG. 1 is a plan view illustrating a possible arrangement of holes in a rotor disc and stator disc.
Figure 1:
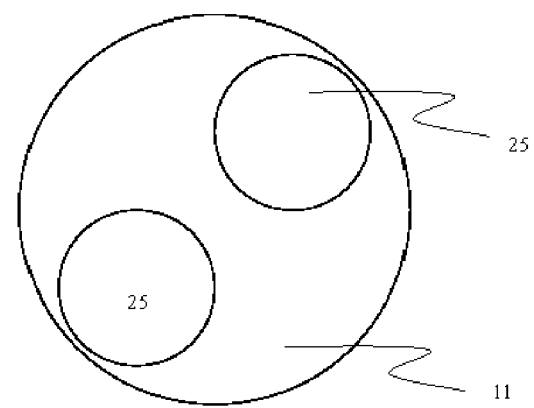
Figure 2:
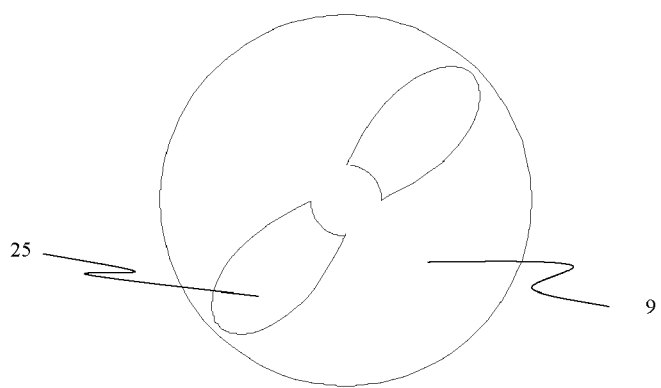
FIG. 2 is a plan view illustrating an alternative design of rotor disc for producing a sinusoidally-varying modulation.

Both stator 9 and rotor 11 discs are substantially rigid. The stator disc 9 is fixed in position and sealed to the wall of the aperture 21 while the rotor disc 11 can rotate about a central vertical axis. The rotor disc 11 and stator disc 9 consist of flat circular discs with holes through them, the holes placed and shaped so that as the rotor disc 11 rotates, the holes in the two discs overlap fully at one or more angles regularly through each rotation and have zero area of overlap at the same number of angles through each rotation. FIG. 1 shows a possible design in which the holes 25 in the rotor disc 11 overlap the holes 27 in the stator disc 9 completely twice during each revolution at intervals of 180° and have zero overlap twice. FIG. 2 shows a more complicated possible configuration of holes in the rotor disc 11 in which the cross-section of the holes 25 varies co-sinusoidally with azimuthal angle around the disc 9 in the first and third quadrants and is zero in the second and fourth quadrants The rotor disc 11 and stator disc 9 are mounted in such a manner that when the holes overlap, water can flow from the reservoir 3 through the overlapping holes 25, 27 and into the surrounding water 13, but when the holes do not overlap the flow of water is very substantially smaller and ideally zero. At intermediate positions the flow of water will be approximately proportional to the area of overlap of the holes 25, 27. Thus the designs shown in FIG. 1 would achieve a smooth variation in water flow rate with angle of rotation of the rotor disc 11. Using the design of rotor disc 11 shown in FIG. 2 will lead to an approximately sinusoidally-varying flow of water through the discs 9, 11 and hence to an approximately sinusoidally-varying radiated pressure signal. In order to achieve this, the leakage flow of water past the discs when the holes 27, 25 do not overlap must be kept to a minimum. This may be achieved for example by mounting the two discs 9, 11 so that there is very little clearance between them producing high resistance to water flow in the plane of the discs 9,11 in the gap between them.

It is well known to those versed in the art of acoustics that a modulated flow of water from an orifice into a large volume will radiate sound at the frequency of modulation. The amplitude of the sound will be proportional to the degree of modulation of the flow. The apparatus is thought to be particularly appropriate for radiating sound at low frequencies such as below 8 Hz and down to at least 0.5 Hz. This is accomplished by causing the rotor disc 11 to rotate at rates at which the hole-passing rate matches the desired frequency of operation. Thus for example the rotor disc 11 illustrated in FIG. 3 should be rotated at 15 RPM to produce acoustic radiation at 0.5 Hz.

The degree of flow modulation is measured in cubic meters per second. At frequencies as low as 1 Hz the flow modulation must be of the order of at least ten cubic meters per second in order to achieve output signals at levels useful for seismic surveys. Consequently the total area of the holes in the rotor disc 11 must be of the order of a few square meters in order to allow sufficient water to pass.

To obtain a swept-frequency signal from the device, the rotor disc 11 is accelerated as rapidly as possible from rest to the rotation rate corresponding to the lowest frequency it is desired to radiate and then accelerated more slowly up to the rotation rate corresponding to the highest desired frequency. The rotor is then halted at a position at which the holes in the rotor disc 11 and stator disc 9 do not overlap so that water flow is substantially halted. For example a sweep might commence at 1 Hz and end at 16 Hz and require 20 seconds to complete. Alternatively the rotor disc 11 may be decelerated so that a frequency sweep is obtained, starting at the highest desired frequency and ending at the lowest. The manner of the sweep may for example be such that frequency changes linearly with time or alternatively it may change in a non-linear fashion for example changing at a rate that varies exponentially with time.

Figure 3:
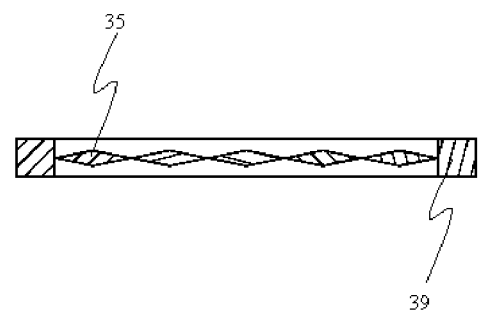
FIG. 3 illustrates a butterfly type valve, suitable for use with the third embodiment of FIG. 2, in the closed position.
Figure 4:
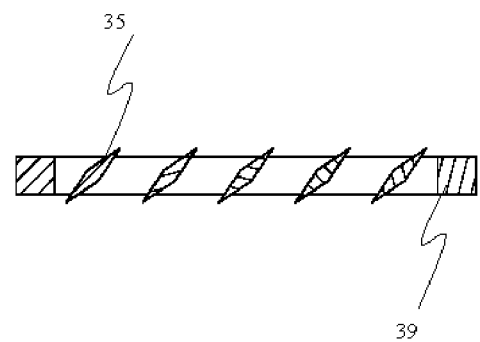
FIG. 4 illustrates the butterfly-type valve of FIG. 3 partially open.

It is a limitation of embodiments of the invention involving a rotor that the rotor is likely to have a significant moment of inertia about its axis of rotation. It must have apertures in the modulating rotor disc 11 large enough to allow the passage of tens of cubic meters of water per second, while being structurally stiff enough to bend negligibly when loaded with an excess water pressure of the order of an atmosphere on its upper surface. It will thus have a large diameter and significant mass, both of which increase the moment of inertia. In an alternative embodiment the rotor disc 11 and stator disc 9 are directly replaced by valve shown in section in FIG. 3 and in FIG. 4. The valve is essentially a butterfly valve with multiple (in this case five) parallel vanes 35 rotating around axes normal to the section. The vanes are longer than they are wide, contained within a square or rectangular frame 39, resembling a Venetian blind whose slats do not overlap but whose edges touch or very nearly touch when the vanes are closed as shown in FIG. 3. The vanes are rotated simultaneously by a hydraulic or electric motor (not shown) so that when they lie in the plane of the valve frame 39 the aperture of the valve is completely or nearly completely sealed and no or very little water can flow through the valve whereas when they are at right angles to the plane of the valve the area through which water can flow is at a maximum. By way of illustration FIG. 4 shows a cross section of the valve in which the vanes have been rotated by 45°, half-way between the fully-closed position illustrated in FIG. 3 and the fully-open position. The flow area does not vary sinusoidally with the rotation of the vanes; consequently if the vanes are rotated at a constant angular rate, the flow rate will vary periodically with the period of the vane rotation but will not be sinusoidal. If it is desired to obtain a sinusoidally-varying flow rate and consequently a sinusoidally-varying radiated pressure signal, the rate of rotation of the vanes from the fully-closed to the fully-open position will need to be varied according to the formula $$\frac{\omega \sin \omega t}{\sqrt{1 - \frac{1}{4}(1 + \cos^2 \omega t)}}$$ [Math. 0001]

In which

[Math.0002]

$\omega$ is the angular frequency of the desired acoustic radiation and

[Math.0003]

$t$ is time. This variable rate of rotation can conveniently be obtained by using a servo control system well known to those versed in the art of mechanical control systems.

The valve described above will have substantially lower rotational inertia than the aforesaid rotor and hence will be easier to accelerate during a frequency sweep and return to rest at the end of a frequency sweep. Its area will be rectangular and therefore the aperture 21 into which it is fitted must be suitably shaped to accommodate the valve, being either of the same rectangular cross section or having an adaptor piece to allow the valve to be fitted to a circular aperture or duct.

Figure 6:
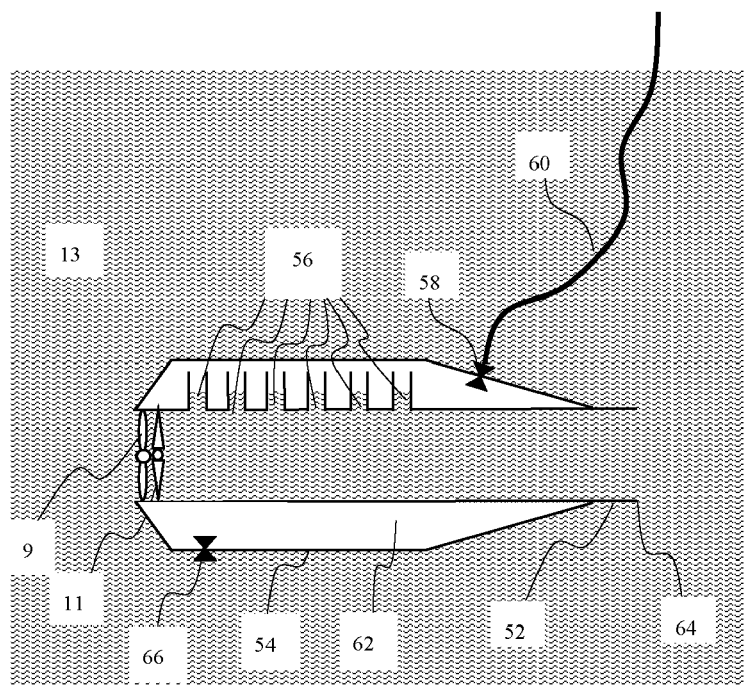
FIG. 6 is side elevation cross section of a second embodiment of a marine seismic source.

FIG. 6 shows a second embodiment of the invention in cross section in which a stator disc 9 and a rotor disc 11 which may for example take the forms illustrated in FIG. 1 are mounted at the rear end of a rigid cylindrical tube 52 several meters in diameter for example six meters in diameter immersed in a liquid 13 which may for example be seawater. During use the tube 52 is maintained substantially horizontal. The tube is longer than its diameter for example four times as long. The tube 52 is surrounded by an annular rigid-walled volume 54 which is mostly or completely filled with gas 62 which may for example be air and whose volume is of the same order as or greater than the volume of the tube 52. One or more passages 56 connect the interior of the tube 52 to the interior of the volume 54. The passages 56 are substantially vertical and connect to the top of the wall of the cylinder 52. A gas valve 58 in the wall of the space 54 is attached to a gas line 60 which leads at its far end to a surface tender vessel (not shown). The gas valve and line 54, 65 are used to maintain sufficient quantity of gas in the volume 54 such that the meniscus between liquid 13 and gas 62 in the passages 56 is on average about half way up the tubes 56. During operation the tube 52 is towed behind a surface vessel at a depth which may for example be 50 meters. The tube is maintained horizontal during towing with its front end 64 facing the direction of tow using means such as hydrofoils well known to those versed in the art. This causes a flow of liquid 13 to enter the tube 52 at its front end 64 and flow out through the stator 11 and rotor 9 at a rate depending on the angular position of the rotor 11 relative to the stator 9. The rotor is caused to rotate at a changing rate as hereinbefore described producing a varying flow of liquid out of the rear of the stator 9 the said flow varying with a period varying from at least 1 second to a significantly shorter period for example one eighth of a second. This results in the radiation of very low frequency sound from the stator 9.

In the absence of the volume 62 and the passages 56 the flow into the tube 52 at its mouth 64 would be virtually identical to the flow out of the stator 9. The mouth 64 would therefore radiate sound virtually identical to the sound radiated from the stator 9 except that its phase would be reversed as is well known to those versed in the art of acoustics. Because the wavelengths of the sound are very much greater than the dimensions of the invention illustrated in FIG. 6, the sound waves output from its two ends would virtually cancel each other, However the passages 56 backed by the volume 62 provide a buffer into and out of which liquid can flow with negligible change in pressure. Thus when the area of overlap of the holes in the rotor 11 and stator 9 is increasing and consequently the flow out of the stator 9 is increasing, the static pressure in the liquid within the tube 64 will tend to decrease. However this pressure decrease will be substantially reduced by a flow of water out of the passages 56 into the tube 64. Conversely when the area of overlap of the holes in the rotor 11 and stator 9 is decreasing and consequently the flow out of the stator 9 is decreasing, the static pressure in the liquid within the tube 64 will tend to increase. However this pressure increase will be substantially reduced by a flow of water into the passages 56 out of the tube 64. The overall effect will be that the static pressure of the liquid in the tube 64 will be maintained substantially constant. In consequence the flow of liquid into the mouth 64 will remain substantially constant and there will be little or substantially less acoustic radiation from the mouth 64 in response to the rotations of the rotor 11. There will therefore be little or substantially less cancellation of the acoustic radiation from the stator 9 and the device will radiate substantially as a monopole source in a manner well known to those versed in the art of acoustics.

In order for the radiation from the mouth 64 to be substantially reduced, there must be a sufficient volume of gas within the volume 62. This may be ensured by making the volume 62 large enough that when the embodiment is at rest in the surrounding fluid the natural frequency of oscillation of the water in the passages 56 is substantially lower than the lowest frequency of the sound that it is desired to radiate, preferably by at least a factor of two.

It will be critical to the operation of the invention shown in FIG. 6 that the volume 62 remains filled with gas and that gas does not escape into the interior of the tube 52. To this end a liquid level sensor (not shown) is deployed in one of the passages 56 and the valve 60 is operated as required to ensure that the average level of liquid in the passages 56 remains approximately half-way up the tubes 56. The height and total cross section of the tubes 56 must be sufficient to ensure that the unsteady movements of the menisci in the tubes 56 does not reach the top or bottom of the tubes 56. This can be ensured for example by making the total area of the passages 56 equal to the cross-sectional area of the main tube 52 and their height equal to the distance that the device will be towed during a complete period of the lowest frequency of sound that it is desired to radiate.

In case water should escape from the passages 56 into the volume 54 there is provided a drainage pump 66 which can be used to drain the said water from the volume 54.

The system as illustrated in FIG. 6 may be revised by replacement of the rotor 11 and stator 9 by the valve illustrated in FIGS. 3 and 4. It will be convenient but not necessary in this case to replace the tube 52 by a square duct.

Figure 7:
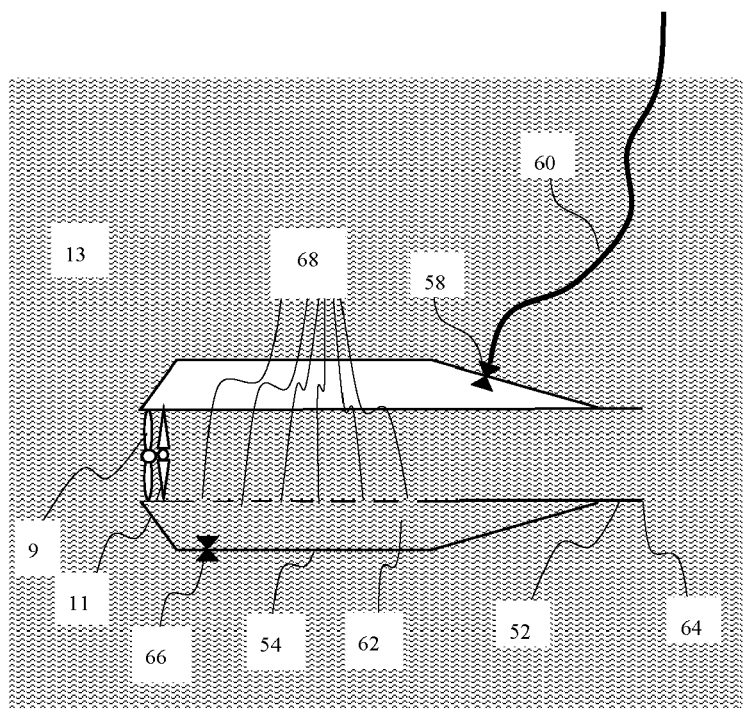
FIG. 7 is side elevation cross section of a fourth embodiment of a marine seismic source.

It is a drawback of the embodiment shown in FIG. 5 that the amount of gas in the volume 54 must be carefully controlled to prevent escape of air into the tube 52 or of water into the volume 54. FIG. 7 shows a further embodiment of the invention which like the embodiment shown in FIG. 6 uses a gas volume 54 which surrounds main tube 52 to substantially reduce or eliminate fluctuations in flow into the mouth 64 during operation but which does not include the passages 56. Instead the volume 54 is partially flooded with water 13 and there is a plurality of openings 68 in the bottom of the wall of the tube 52 which allow water to move easily between the tube 52 and the volume 54. The total area of these openings 68 is governed by the same considerations as the area of the passages 56 in FIG. 6. The valve 58 and pump 66 must be used to keep the water level in the lower half of the volume 54 sufficient to keep the openings 68 submerged during the entire operating cycle. This could be very simply accomplished for example by using a volume 54 about twice as great as used in the second and third embodiments hereinbefore described, and maintaining it approximately half full of water.

Figure 8:
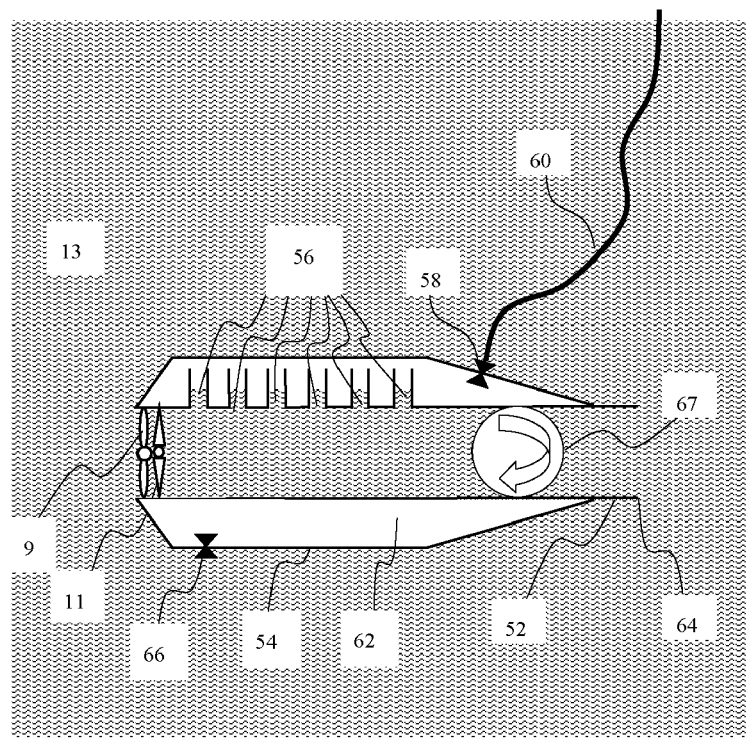
FIG. 8 is side elevation cross section of a sixth embodiment of a marine seismic source.

It is a drawback of the embodiments illustrated in FIGS. 5, 6 and 7 that the strength of seismic signals produced by the source is dependent on the speed at which the seismic source is towed through the body of water. Additionally, in order to achieve the strength of signals required for seismic surveys, it is necessary that the tube 54 of FIG. 6 has an exceedingly large diameter. The dependency upon tow speed can be removed, together with an overall reduction in diameter, by forcing the water through the tube with a water pump 67, located proximate the inlet of the tube 54. This arrangement is shown in FIG. 8, with the pump 67 illustrated schematically. Again the embodiment of FIG. 8 can be modified by using vanes at the outlet instead of a rotor and can also be modified by using the alternative buffering arrangement illustrated in FIG. 7.

The tube as illustrated in FIGS. 5-8 can have a cross section of any shape or variable shape, however, it will be understood that when a rotor and stator are to be used, it is preferable that the tube has a circular cross section at least in the portion of the tube where the rotor is housed.

The invention claimed is:

1. A marine seismic source suitable for producing seismic signals over a band of frequencies comprising:
a reservoir for containing water;
a flow path between the reservoir and a body of water;
means to cause water in the reservoir to flow into the body of water via the flow path;
means to modulate an area of the flow path whereby the flow of water from the reservoir into the body of water is modulated to produce a modulated pressure signal in the body of water; and
a buffer means configured to minimize fluctuations in static pressure of the water within at least one of the reservoir and flow path as the area of the flow path is modulated, the buffer means comprising a plenum for containing gas in communication with at least one of the reservoir and flow path and arranged such that water from the reservoir or flow path can flow into or out of the plenum in contact with the gas as the area of the flow path is modulated,
wherein the means to modulate comprises a stator and a rotor mounted coaxially with the stator, the stator and rotor being located within the flow path, the stator and rotor each having at least one aperture wherein the apertures overlap as the rotor rotates, the overlap of the apertures falls to zero at one or more angular positions of the rotor, the apertures of the stator and rotor are shaped so that the area of overlap of the apertures in the rotor and stator varies smoothly as the rotor rotates, and that the rotor and stator are mounted sufficiently close to one another that when there is no overlap of the apertures the flow of water into the body of water is substantially smaller than that when the apertures overlap fully.

2. The seismic source according to claim 1, being adapted to be drawn through the body of water to cause water to flow from the reservoir and along the flow path.

3. The seismic source according to claim 1, further comprising means to increase and reduce the pressure of the gas within the plenum.

4. The seismic source according to claim 3, further comprising a tube which defines the reservoir and flow path.

5. The seismic source according to claim 4, wherein the plenum extends around the tube.

6. The seismic source according to claim 1, further comprising means to discharge gas from the reservoir without the discharge gas entering the external body of water; and wherein water is caused to flow from the reservoir into the body of water by means of pressurized gas held in a pressure vessel, the pressure vessel and reservoir being adapted to be held within the body of water wherein the pressure vessel and reservoir are joined and separated by a wall provided with a valve to allow the passage of gas from the pressure vessel into the reservoir.

7. The seismic source according to claim 6, further comprising an air line to allow the pressure vessel to be pressurized using a gas supply located above the surface of the body of water.

8. The seismic source according to claim 1, further including means to cause the rate of rotation of the rotor to change so that the source radiates signals through a band of frequencies.

9. The seismic source according to claim 1, further including means to change the rate of angular acceleration of the rotor so that the energy radiated per unit bandwidth of the output signal remains constant.

10. The seismic source according to claim 1, further including means to vary the flow of water from the reservoir in proportion to the period of the radiated signal such as to maintain constant the energy radiated per unit bandwidth of the output signal.

11. The seismic source according to claim 1, further including means to detect the angular position of the rotor relative to the stator; a motor that is controlled by a feedback system which activates the motor and uses an encoder as an error sensor.

12. The seismic source according to claim 1 wherein:
the flow path comprises a duct arranged to extend downwards into the body of water;
the duct is longer than it is wide; and
that the means to modulate the area of the flow path is located at or towards the lower end of the duct; and in which the seismic source comprises a plenum in communication with the duct at a point above the means to modulate the area of the flow path, the plenum being capable of holding a sufficient volume of gas at a pressure substantially equal to that of the water at the point at which the duct area is modulated so as to reduce the resonant frequency of the water in the duct.

13. The seismic source according to claim 1, further comprising a fluid pump configured to drive water along the flow path.

14. The seismic source according to claim 1, in which the means to modulate the area of the flow of water comprises a valve having one or more vanes rotatable between an open and closed position about an axis normal to the direction of fluid flow through the flow path.

15. The seismic source according to claim 1 wherein the seismic source produces seismic signals over a band of frequencies as low as 0.5 Hz.

16. A marine seismic source suitable for producing seismic signals over a band of frequencies comprising: a reservoir of water;
a flow path to provide water communication between the reservoir and a body of water;
means to modulate the area of the flow path thereby modulating the flow of water into the body of water so as to produce a modulated pressure signal in the body of water; and
a buffer means configured to minimize fluctuations in static pressure of the water within at least one of the reservoir and flow path as the area of the flow path is modulated, the buffer
means comprising a plenum for containing gas in communication with at least one of the reservoir and flow path and arranged such that water from the reservoir or flow path can flow into or out of the plenum in contact with the gas as the area of the flow path is modulated,
wherein the means to modulate comprises a stator and a rotor mounted coaxially with the stator, the stator and rotor being located within the flow path, the stator and rotor each having at least one aperture wherein the apertures overlap as the rotor rotates, the overlap of the apertures falls to zero at one or more angular positions of the rotor, the apertures of the stator and rotor are shaped so that the area of overlap of the apertures in the rotor and stator varies smoothly as the rotor rotates, and that the rotor and stator are mounted sufficiently close to one another that when there is no overlap of the apertures the flow of water into the body of water is substantially smaller that when the apertures overlap fully.

17. A method of producing seismic signals in a body of water over a band of frequencies, comprising:
directing a flow of water from a reservoir into the body of water through a duct;
modulating the flow of water by modulating the area of the duct through which the water flows;
providing a buffer means configured to minimize fluctuations in static pressure of the water within at least one of the reservoir and flow path as the area of the flow path is modulated, the buffer means comprising a plenum for containing gas in communication with at least one of the reservoir and flow path and arranged such that water from the reservoir or flow path can flow into or out of the plenum in contact with the gas as the area of the flow path is modulated,
wherein modulating the area comprises rotating a rotor mounted coaxially with a stator, the stator and rotor being located within the flow path, the stator and rotor each having at least one aperture wherein the apertures overlap as the rotor rotates, the overlap of the apertures falling to zero at one or more angular positions of the rotor, the apertures of the stator and rotor being shaped so that the area of overlap of the apertures in the rotor and stator varies smoothly as the rotor rotates, and that the rotor and stator are mounted sufficiently close to one another that when there is no overlap of the apertures the flow of water into the body of water is substantially smaller that when the apertures overlap fully.

18. The method of producing seismic signals according to claim 17 wherein the seismic source is moved through the body of water so as to cause water to flow from the reservoir through the duct and into the body of water.

19. The method according to claim 18 wherein the reservoir and duct are formed from a tube which is held substantially parallel to the surface of the body of water.

20. A marine seismic source suitable for producing seismic signals over a band of frequencies comprising:
a reservoir for containing water;
a flow path between the reservoir and a body of water;
means to cause water in the reservoir to flow into the body of water via the flow path;
means to modulate an area of the flow path whereby the flow of water from the reservoir into the body of water is modulated to produce a modulated pressure signal in the body of water; and
a buffer means configured to minimize fluctuations in static pressure of the water within at least one of the reservoir and flow path as the area of the flow path is modulated, the buffer means comprising a plenum for containing gas in communication with at least one of the reservoir and flow path and arranged such that water from the reservoir or flow path can flow into or out of the plenum in contact with the gas as the area of the flow path is modulated,
wherein the means to modulate the flow of water comprises a valve having vanes rotatable between an open and closed position about an axis normal to the direction of fluid flow through the flow path thereby smoothly varying the area of the flow of water as the vanes rotate to radiate pressure signals at a frequency corresponding to the modulation of flow, wherein the seismic source is adapted to be drawn through the body of water to cause water to flow from the reservoir and along the flow path.

21. The seismic source according to claim 20 wherein the seismic source produces seismic signals over a band of frequencies as low as 0.5 Hz.

* * * * *